United States Patent
Asada et al.

(10) Patent No.: US 11,871,089 B2
(45) Date of Patent: Jan. 9, 2024

(54) VIDEO MODIFICATION AND TRANSMISSION USING TOKENS

(71) Applicant: GREE, Inc., Tokyo (JP)

(72) Inventors: Shuhei Asada, Tokyo (JP); Motoki Uchida, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 17/849,202

(22) Filed: Jun. 24, 2022

(65) Prior Publication Data

US 2022/0329918 A1 Oct. 13, 2022

Related U.S. Application Data

(63) Continuation of application No. 17/131,264, filed on Dec. 22, 2020, now Pat. No. 11,418,855.

(30) Foreign Application Priority Data

Jan. 27, 2020 (JP) .................................. 2020-011016

(51) Int. Cl.
*H04N 21/81* (2011.01)
*H04N 21/845* (2011.01)

(52) U.S. Cl.
CPC ....... *H04N 21/816* (2013.01); *H04N 21/8146* (2013.01); *H04N 21/8456* (2013.01)

(58) Field of Classification Search
CPC ............ H04N 21/816; H04N 21/8146; H04N 21/8456
See application file for complete search history.

(56) References Cited

U.S. PATENT DOCUMENTS

| 10,297,081 B2 | 5/2019 | Satake |
| 11,418,855 B2 | 8/2022 | Asada et al. |
| 2011/0078578 A1 | 3/2011 | Calis |
| 2018/0063599 A1 | 3/2018 | Park et al. |
| 2018/0123711 A1 | 5/2018 | Kitazato et al. |

(Continued)

FOREIGN PATENT DOCUMENTS

| JP | 6212667 B1 | 9/2017 |
| JP | 6543403 B1 | 7/2019 |

OTHER PUBLICATIONS

"Mirrativ" (website) with its pertinent English translation (https://www.mirrativ.com), downloaded on Mar. 5, 2021, 2 pages.

(Continued)

*Primary Examiner* — Randy A Flynn
(74) *Attorney, Agent, or Firm* — Klarquist Sparkman, LLP

(57) ABSTRACT

Methods and apparatus are disclosed for video transmission using tokens. According to one example, computer-readable storage media storing computer-readable instructions, which when executed by a computer having at least one processor, cause the computer to: generate a video including an animation of an avatar object of a distributor generated on the basis of motion data regarding a motion of the distributor and an animation of a token object given by a viewer to the distributor operating according to a predetermined rule; and transmit, toward a plurality of viewer terminals via a communication line, coordinate data including data regarding coordinates of the token object associated with a reference time, and audio data regarding a voice of the distributor associated with the reference time.

17 Claims, 8 Drawing Sheets

(56) References Cited

U.S. PATENT DOCUMENTS

| | | |
|---|---|---|
| 2018/0253897 A1 | 9/2018 | Satake |
| 2018/0316734 A1* | 11/2018 | Nakabo .............. H04L 65/4053 |
| 2021/0225168 A1 | 7/2021 | Asada et al. |
| 2021/0235168 A1 | 7/2021 | Asada et al. |

OTHER PUBLICATIONS

Office Action (OA) dated Jul. 14, 2020, for the priority application (JP Pat. Appl. No. 2020-011016) together with its English machine translation, 8 pages.

* cited by examiner

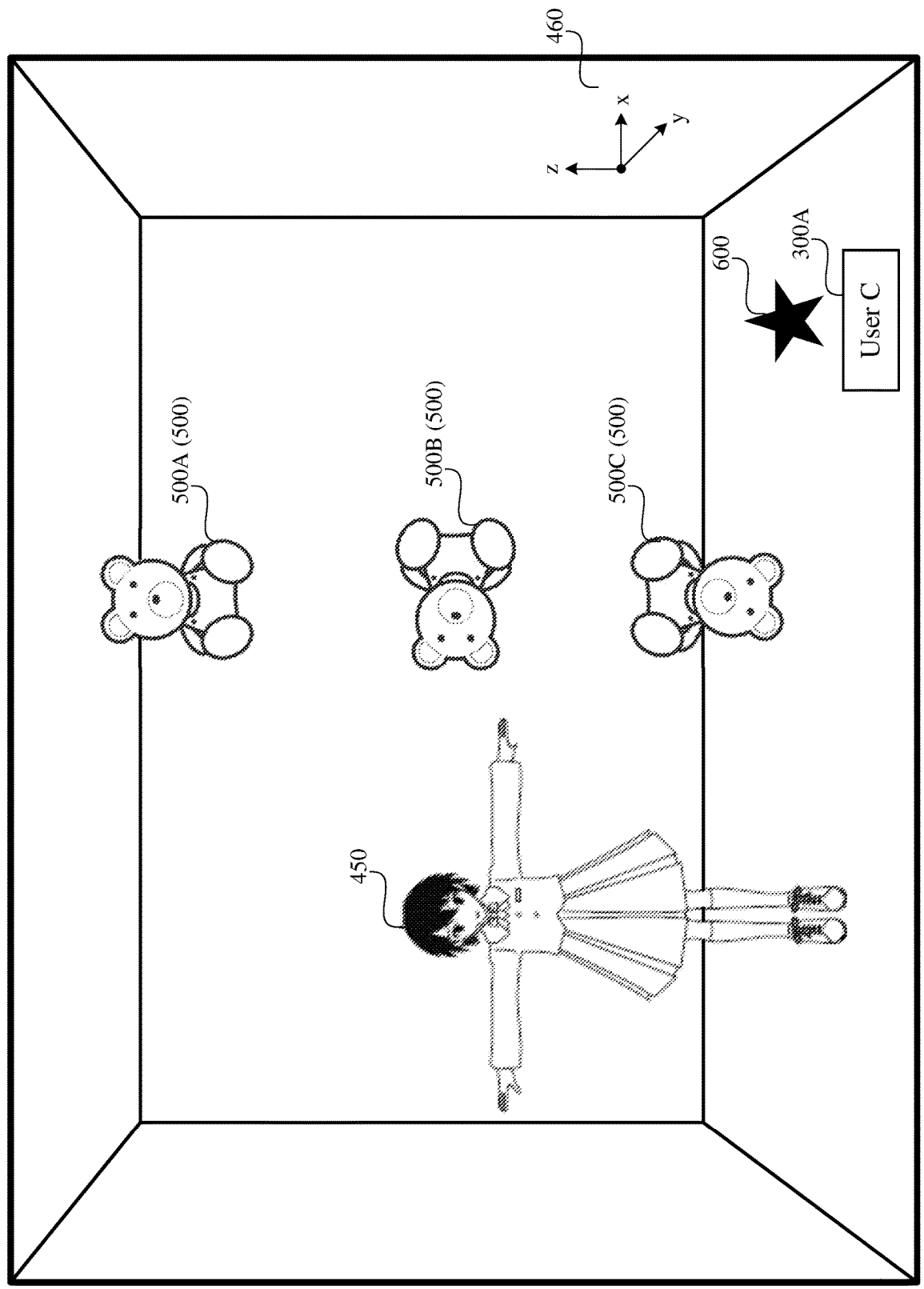

VIDEO MODIFICATION AND TRANSMISSION USING TOKENS

CROSS-REFERENCE TO RELATED APPLICATIONS

This application is a continuation of U.S. application Ser. No. 17/131,264, filed Dec. 22, 2020, entitled "VIDEO MODIFICATION AND TRANSMISSION USING TOKENS," which application claims priority to Japanese Patent Application No. 2020-011016, filed on Jan. 27, 2020, entitled "Computer Program, Method, and Server Device." Both applications are incorporated herein by reference in their entirety as if set forth fully herein.

FIELD

The technology disclosed in the present application relates to a system that distributes, to a plurality of users, an audio generated on the basis of a voice of a distributor and a video generated on the basis of a motion of the distributor.

BACKGROUND

As a service for distributing music and videos to a plurality of users, "Mirrativ" is known, which is provided on a website identified by the following URL.
https://www.mirrativ.com/
In this service, a distributor can transmit, to a plurality of viewers via a communication network, an audio generated on the basis of a voice of this distributor and a video including animation of an avatar generated on the basis of a motion of this distributor. Each viewer who views the video or the like distributed by such distributor can give a token (gift) to the distributor. When a token is given, an object corresponding to the token is displayed in a video distributed by the distributor.

SUMMARY

Method and apparatus for distributing and modifying video in a networked computer environment are disclosed. In some examples of a video streaming service, each viewer can exchange data with a distributor including comments, video data, audio data, image data, and/or location data. Each viewer can also determine to transmit one or more messages or packets encoded with one or more tokens to the distributor. In the disclosed technology field, such tokens may also be referred to as elective tokens or "gifts." Similarly, token data may be referred to as "gift data."

However, the video distributed from the distributor to each viewer via the communication network has a relatively large capacity. Therefore, if the bandwidth of the communication network used by each viewer is narrow and/or if the communication network is congested, there is a possibility that a delay occurs in the video distributed to each viewer. In order to cope with such a problem, it is conceivable a method in which the terminal device of the distributor transmits, to each viewer, video data regarding the motion of the distributor and the given token (gift) together with an audio signal, and the terminal device of each viewer generates the video on the basis of the received video data and reproduces the audio on the basis of the received audio signal.

The video data transmitted by the distributor intermittently conveys, at the time when a change occurs in the motion of the distributor and/or a token (gift) is given, the contents of the change and/or the contents of the token (gift). On the other hand, the audio signal transmitted by the distributor continuously conveys, for a period during which the distributor makes a voice, the contents of the voice. Therefore, it is conceivable that the terminal device of each viewer buffers the audio signal received from the distributor, thereby reproducing the audio with the interruption caused by the failure of the communication network or the like suppressed. As a result, in the terminal device of each viewer, there is a possibility that the timing of reproducing the audio on the basis of the audio signal and the timing of drawing an object corresponding to the token (gift) on the basis of the video data deviate from one another.

Accordingly, the technique disclosed in the present application provides a method that can at least in part suppress the deviation between the timing of reproducing an audio and the timing of drawing an object corresponding to the token (gift).

Computer-readable storage media according to one aspect of the disclosed technology can be "computer-readable storage media storing computer-readable instructions, which when executed by a computer having at least one processor, cause the computer to: generate a video including an animation of an avatar object of a distributor generated on the basis of motion data regarding a motion of the distributor and an animation of a token object given by a viewer to the distributor operating according to a predetermined rule; and transmit, toward a plurality of viewer terminals via a communication line, coordinate data including data regarding coordinates of the token object associated with a reference time, and audio data regarding a voice of the distributor associated with the reference time."

A terminal device according to one aspect of the disclosed technology can be "a terminal device, comprising: at least one processor, wherein the at least one processor: generates a video including an animation of an avatar object of a distributor generated on the basis of motion data regarding a motion of the distributor and an animation of a token object given by a viewer to the distributor operating according to a predetermined rule; and transmits, toward a plurality of viewer terminals via a communication line, coordinate data including data regarding coordinates of the token object associated with a reference time, and audio data regarding a voice of the distributor associated with the reference time."

A method according to one aspect of the disclosed technology can be "a computer-implemented method for automatically generating customized video in an interactive network application, the method comprising: with at least one processor: generating a video including an animation of an avatar object of a distributor generated on the basis of motion data regarding a motion of the distributor and an animation of a token object given by a viewer to the distributor operating according to a predetermined rule; and transmitting, toward a plurality of viewer terminals via a communication line, coordinate data including data regarding coordinates of the token object associated with a reference time, and audio data regarding a voice of the distributor associated with the reference time."

Computer-readable storage media according to another aspect of the disclosed technology can be "computer-readable storage media storing computer-readable instructions, which when executed by a computer having at least one processor, cause the computer to: receive, from a terminal device of a distributor via a communication line, coordinate data including data regarding coordinates of a token object given by a viewer to the distributor associated with a reference time, and audio data regarding a voice of the distributor associated with the reference time, the token object operating according to a predetermined rule; generate a video including an animation of the token object and an animation of an avatar object of the distributor using the coordinate data; and generate an audio signal based on a voice of the distributor using the audio data."

A terminal device according to another aspect of the disclosed technology can be "a terminal device, comprising: at least one processor, wherein the at least one processor: receive, from a terminal device of a distributor via a communication line, coordinate data including data regarding coordinates of a token object given by a viewer to the distributor associated with a reference time, and audio data regarding a voice of the distributor associated with the reference time, the token object operating according to a predetermined rule; generate a video including an animation of the token object and an animation of an avatar object of the distributor using the coordinate data; and generate an audio signal based on a voice of the distributor using the audio data."

A method according to another aspect of the disclosed technology can be "a computer-implemented method for automatically generating customized video in an interactive network application, the method comprising: with at least one processor: receiving, from a terminal device of a distributor via a communication line, coordinate data including data regarding coordinates of a token object given by a viewer to the distributor associated with a reference time, and audio data regarding a voice of the distributor associated with the reference time, the token object operating according to a predetermined rule; generating a video including an animation of the token object and an animation of an avatar object of the distributor using the coordinate data; and generating an audio signal based on a voice of the distributor using the audio data."

A server device according to one aspect of the disclosed technology can be "a server device, comprising: At least one processor, wherein the at least one processor: receives, from a terminal device of a distributor via a communication line, coordinate data including data regarding coordinates of a token object given by a viewer to the distributor associated with a reference time, and audio data regarding a voice of the distributor associated with the reference time, the token object operating according to a predetermined rule; and sends the coordinate data and the audio data to a plurality of viewer devices via the communication line, to allow the plurality of viewer devices to generate: a video including an animation of an avatar object of the distributor generated on the basis of motion data regarding a motion of the distributor and an animation of the token object; and an audio signal based on a voice of the distributor."

A method according to another aspect of the disclosed technology can be "a computer-implemented method for automatically generating customized video in an interactive network application, the method comprising: with at least one processor: receiving, from a terminal device of a distributor via a communication line, coordinate data including data regarding coordinates of a token object given by a viewer to the distributor associated with a reference time, and audio data regarding a voice of the distributor associated with the reference time, the token object operating according to a predetermined rule; and sending the coordinate data and the audio data to a plurality of viewer devices via the communication line, to allow the plurality of viewer devices to generate: a video including an animation of an avatar object of the distributor generated on the basis of motion data regarding a motion of the distributor and an animation of the token object; and an audio signal based on a voice of the distributor."

A system according to one aspect of the disclosed technology can be "a system, comprising: a first terminal of a distributor; a second terminal a viewer; and a server, wherein the first terminal is configured to transmits, toward the second terminal via the server, coordinate data including data regarding coordinates of a token object given by the viewer to the distributor associated with a reference time, and audio data regarding a voice of the distributor associated with the reference time, the token object operating according to a predetermined rule, and wherein the second terminal is configured to: receive, from the first terminal via the server, the coordinate data and the audio data; generate a video including an animation of the token object and an animation of an avatar object of the distributor using the coordinate data; and generate an audio signal based on a voice of the distributor using the audio data."

A method according to another aspect of the disclosed technology can be "a method in a system including a first terminal of a distributor, a second terminal of a viewer, and a server, comprising: the first terminal transmitting, toward the second terminal via the server, coordinate data including data regarding coordinates of a token object given by the viewer to the distributor associated with a reference time, and audio data regarding a voice of the distributor associated with the reference time, the token object operating according to a predetermined rule; the second terminal receiving, from the first terminal via the server, the coordinate data and the audio data; the second terminal generating a video including an animation of the token object and an animation of an avatar object of the distributor using the coordinate data; and the second terminal generating an audio signal based on a voice of the distributor using the audio data."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF THE DRAWINGS

FIG. 8 is a schematic view showing an example of a video displayed on the display unit 310 of the terminal device 10 of each viewer in the video distribution system 1 shown in FIG. 1.

DETAILED DESCRIPTION

Figure 1:
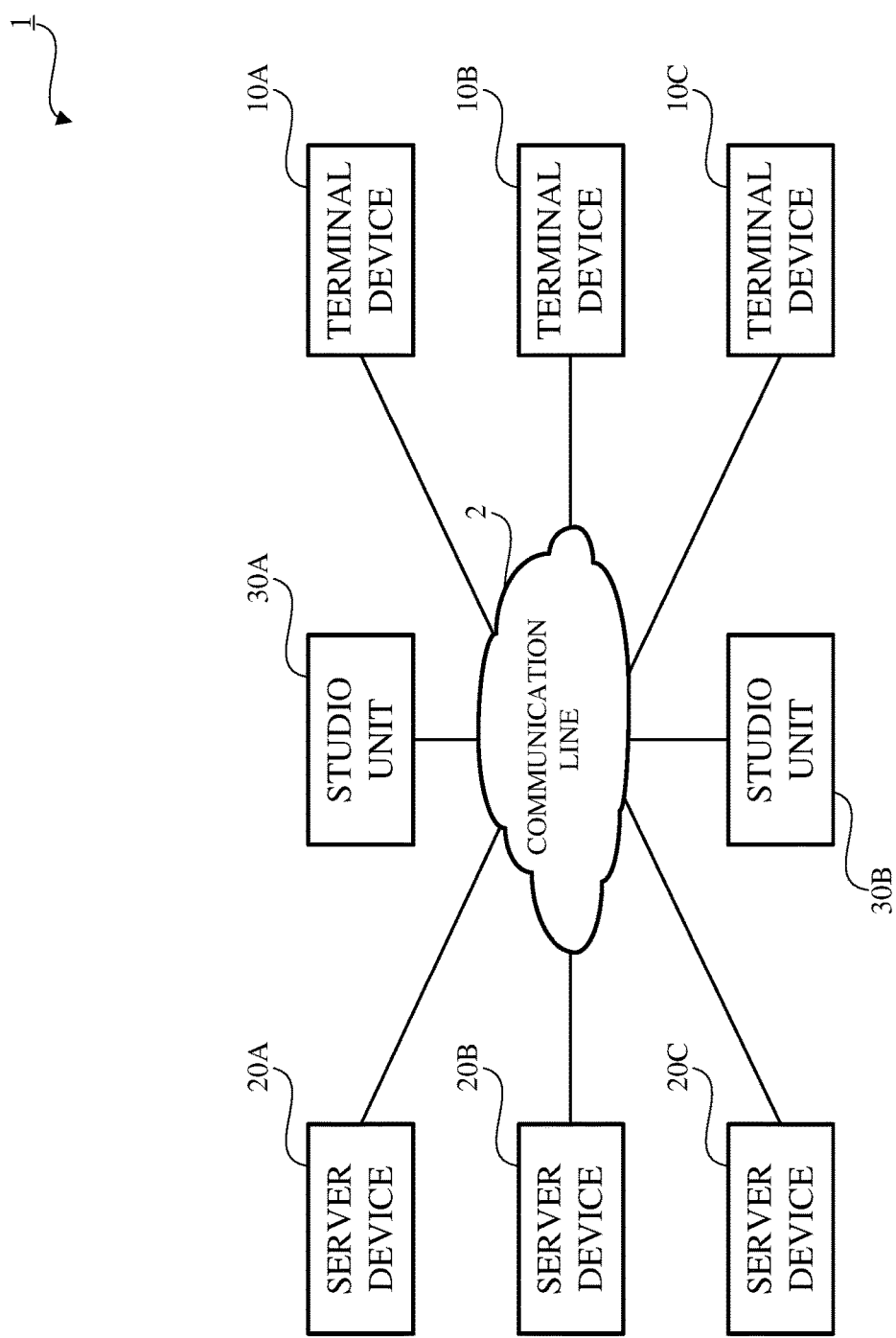
FIG. 1 is a block diagram showing an example of the configuration of a video distribution system according to one embodiment.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "distribute" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As will be described in further detail herein, certain examples of the disclosed technology can be used in a networked video transmission system to provide interactive applications, such as games, social media, and other forms of interactive communication. In some examples, token data can be transmitted from a viewer terminal device to a distributor terminal device operating concurrently to provide an interactive application. A server at the distributor, or the distributor terminal device itself, can process the data to render modified video data that is encoded and sent to the viewer terminal device. This allows for interactive applications to be processed at the distributor, which can reduce the amount of computing resources required at the viewer terminal devices to render the modified video data locally. Further, in some examples, the modified video data is transmitted not just to the viewer device that sent token data, but can also be transmitted to other viewer devices participating in the interactive application. This can further reduce computing resources required at each of the additional viewer devices or allow for more extensive effects to be added to the transmitted video. In addition, certain disclosed techniques allow security and maintenance operations associated with interactive applications such as game programs to be performed at the distributor, further reducing complexity of the application.

In the following, various embodiments will be described with reference to the accompanied drawings. Additionally, common elements as shown in drawings are assigned with a same reference sign. Also, it should be noted that there are cases where an element as shown in one drawing is omitted in another drawing for the purposes of explanation. Further, it should be noted that the accompanied drawings are not necessarily described to scale.

1. Example of Video Distribution System

In short, the video distribution system disclosed in the present application performs the following operations. First, when distributing a video, the terminal device of a user (Hereinafter referred to as "distributor") who distributes the video can transmit reference time data regarding a reference time to the terminal device of a user (Hereinafter referred to as "viewer") who views the video. The reference time data can indicate a reference time that is a time that changes with the passage of time and that is used as a reference by the terminal device of each viewer who reproduces audio and video.

Also, the terminal device of the distributor can put a time stamp based on the reference time to the audio data regarding the voice of the distributor and transmit the audio data with such time stamp to the terminal device of each viewer.

Furthermore, the terminal device of the distributor can transmit avatar data regarding the avatar object of the distributor to the terminal device of each viewer. The terminal device of the distributor can put a time stamp based on the reference time to the avatar data and transmit the avatar data with such time stamp to the terminal device of each viewer.

Furthermore, when receiving token data (gift data) indicating that a token (gift) is given to the distributor, the terminal device of the distributor generates token object data (gift object data) regarding the token object (gift object) corresponding to the token (gift). The terminal device of the distributor can put a time stamp based on the reference time to the token object data (gift object data) and transmit the token object data (gift object data) with such time stamp to the terminal device of each viewer.

On the other hand, by using the audio data with the time stamp received from the terminal device of the distributor, the terminal device of each viewer can reproduce the audio signal on the basis of the reference time indicated by the received reference time data.

Also, by using the video data and token object data (gift object data) with the time stamp received from the terminal device of the distributor, the terminal device of each viewer can generate a video on the basis of the reference time indicated by the received reference time data.

FIG. 1 is a block diagram showing an example of the configuration of a video distribution system according to one embodiment. As shown in FIG. 1, a video distribution system 1 can include one or more terminal devices 10 connected to a communication network (communication line) 2 and one or more server devices 20 connected to the communication line 2. Each terminal device 10 is connected to one or more server devices 20 via the communication line 2. Additionally, FIG. 1 shows, for example, terminal devices 10A to 10C as one or more terminal devices 10, but one or more terminal devices 10 other than those can be used similarly. FIG. 1 shows, for example, server devices 20A to 20C as one or more server devices 20, but one or more server devices 20 other than those can be used similarly. Additionally, the communication line 2 can include a mobile telephone network, a wireless LAN, a landline telephone network, the Internet, an intranet, and/or Ethernet, without being limited thereto. More specifically, the communication line 2 can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

Furthermore, in one embodiment, the video distribution system 1 can include one or more studio units 30 connected to the communication line 2. Each studio unit 30 is connected to one or more server devices 20 via the communication line 2. Additionally, FIG. 1 shows, for example, studio units 30A and 30B as one or more studio units 30, but one or more studio units 30 other than those can be used similarly. Each studio unit 30 can have the similar functions to those of the terminal device 10 described later and/or the server device 20 described later.

Hereinafter, for the sake of simplicity of description, attention will be paid to the cases where the terminal device 10 of the distributor distributes a video to the terminal device 10 of each viewer via the server device 20. Alternatively or additionally, by having the similar functions to those of the terminal device 10, the studio unit 30 facing the distributor distributes a video to the terminal device 10 of each viewer via the server device 20.

1-1. Terminal Device 10

A plurality of terminal devices 10 can include one or more distributor terminal devices 10 and one or more viewer terminal devices 10. Each terminal device 10 can have a common configuration and thus may include a terminal device 10 for distributing a video and/or a terminal device 10 for viewing a video.

When operating as a terminal device for distributing a video (distributor terminal device), each terminal device 10 can distribute the video via the server device 20 by executing a video distribution application (It may be middleware or a combination of an application and middleware. The same applies hereinafter.) having been installed thereon. Such video is distributed by the server device 20 via the communication line 2 to the terminal device 10 for receiving the video (viewer terminal device), which executes a video view application (It may be middleware or a combination of an application and middleware. The same applies hereinafter.) having been installed thereon.

Also, when operating as a terminal device of the distributor, by executing the video distribution application, each terminal device 10 can receive, via the server device 20 from the terminal device 10 of the viewer who views the video (distributed by the terminal device 10 of the distributor), token data indicating that a token is given to the distributor and/or comment data indicating that a comment is transmitted to the distributor.

When operating as a terminal device for viewing a video (viewer terminal device), on the other hand, by executing the installed video view application, each terminal device 10 can receive, from the server device 20, the video distributed by the terminal device 10 of the distributor.

Also, by executing the video view application, while receiving a video, each terminal device 10 can transmit, to the terminal device 10 of the distributor via the server device 20, token data indicating that a token is given to the distributor distributing the video and/or comment data indicating that a comment is transmitted to the distributor.

Additionally, the above-described video distribution application and video view application can be installed and executed on each terminal device 10 as an integrated application (which may be middleware or a combination of middleware and an application) or as separate applications (which may be middleware or a combination of middleware and an application).

Each terminal device 10 is an arbitrary terminal device capable of executing such operation, and can include a smartphone, a tablet, a mobile phone (feature phone), and/or a personal computer, without being limited thereto.

1-2. Server Device 20

Each server device 20 can distribute the video transmitted by the terminal device 10 of each distributor to the terminal device 10 of each viewer.

Also, each server device 20 can transmit, to the terminal device 10 of the distributor, token data indicating that a token is given to the distributor and/or comment data indicating that a comment is transmitted to the distributor, transmitted by the terminal device 10 of each viewer.

Additionally, in one embodiment, all of the operations related to the distribution of videos, the operations related to the token data and the operations related to the comment data can be executed by each server device 20. In another embodiment, these operations can be shared and executed by a plurality of server devices 20 (thus, the load on each server device 20 can be decentralized).

1-3. Studio Unit 30

The studio unit 30 can be disposed in a studio, a room, a hall, or the like, which is a place where a performer/actor distributes a video. As described above, the studio unit 30 can perform the similar function to that of the terminal device 10.

2. Hardware Configuration of Each Device

Next, an example of the hardware configuration of each terminal device 10 and each server device 20 will be described.

2-1. Hardware Configuration of Terminal Device 10

Figure 2:
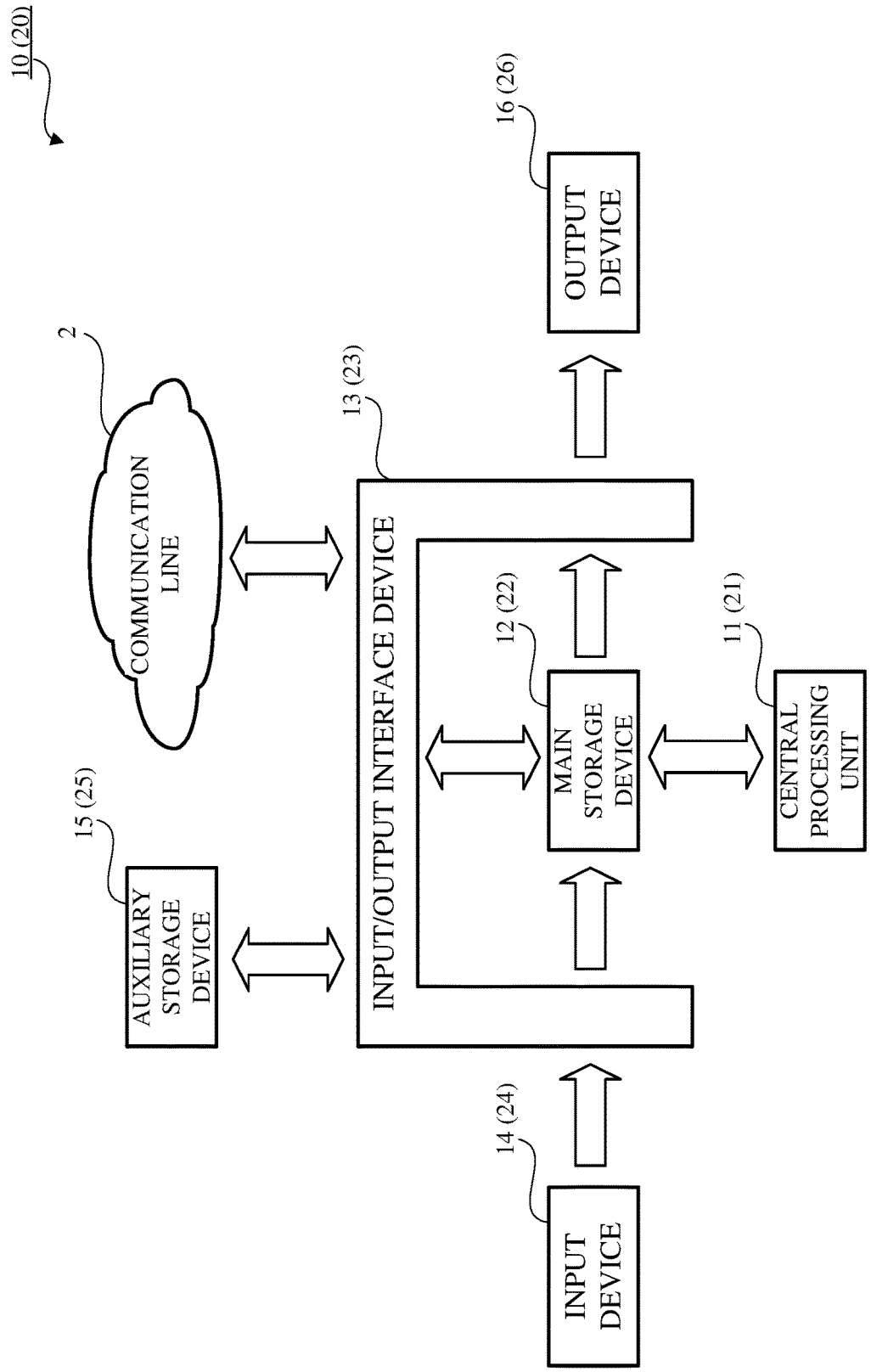
FIG. 2 is a block diagram schematically showing an example of the hardware configuration of the terminal device 10 (server device 20) shown in FIG. 1

A hardware configuration example of each terminal device 10 will be described with reference to FIG. 2. FIG. 2 is a block diagram schematically showing an example of the hardware configuration of the terminal device 10 (server device 20) shown in FIG. 1 (Additionally, in FIG. 2, reference sings in parentheses are described in relation to the server device 20 as described later).

As shown in FIG. 2, each terminal device 10 can mainly include a central processing unit 11, a main storage device 12, an input/output interface device 13, an input device 14, an auxiliary storage device 15, and an output device 16. These devices are connected to one another by a data bus and/or a control bus.

The central processing unit 11, which is referred to as a "CPU", performs operations on instructions and data stored in the main storage device 12, and stores the results of the operations in the main storage device 12. Furthermore, the central processing unit 11 can control the input device 14, the auxiliary storage device 15, the output device 16, and the like via the input/output interface device 13. The terminal device 10 can include one or more such central processing units 11.

The main storage device 12, which is referred to as a "memory", stores instructions and data received from the input device 14, the auxiliary storage device 15, and the communication line 2 (server device 20 and the like) via the input/output interface device 13, as well as operation results of the central processing unit 11. The main storage device 12 can include a random access memory (RAM), a read only memory (ROM), and/or a flash memory, without being limited thereto. More specifically, the main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device having a capacity larger than that of the main storage device 12. The auxiliary storage device 15 can store the instructions and data (computer programs) constituting the above-described specific applications (video distribution application, video view application, and the like) and a web browser application, and the like. The auxiliary storage device 15 can be controlled by the central processing unit 11 to transmit these instructions and data (computer programs) to the main storage device 12 via the input/output interface device 13. The auxiliary storage device 15 can include a magnetic disk device and/or an optical disk device, without being limited thereto.

The input device 14 is a device that can take in data from the outside, and includes a touchscreen, a button, a keyboard, a mouse, and/or one or more sensors, without being limited thereto. As described later, the one or more sensors can include one or more sensors that include one or more cameras and the like and/or one or more microphones and the like, without being limited thereto.

The output device 16 can include a display device, a touchscreen, and/or a printer device, without being limited thereto.

With such hardware configuration, by sequentially loading, into the main storage device 12, the instructions and data (computer programs) constituting the specific application stored in the auxiliary storage device 15, and calculating the loaded instructions and data, the central processing unit 11 can control the output device 16 via the input/output interface device 13 or transmit/receive various pieces of data to/from other devices (e.g., the server device 20 and the other terminal devices 10) via the input/output interface device 13 and the communication line 2.

Therefore, the terminal device 10 can execute at least one of the following operations, for example, by executing the specific application (middleware or a combination of an application and middleware) having been installed:
  Operation of distributing a video;
  Operation of receiving token data and/or comment data transmitted to the own terminal device 10 by another terminal device 10;
  Operation of receiving and displaying a video distributed by another terminal device 10; or
  Operation or the like (including various operations described later in detail) of transmitting token data and/or comment data to another terminal device 10.

Additionally, the terminal device 10 may include one or more microprocessors and/or graphics processing units (GPU) instead of the central processing unit 11 or along with the central processing unit 11.

2-2. Hardware Configuration of Server Device 20

A hardware configuration example of each server device 20 will be described similarly with reference to FIG. 2. The hardware configuration of each server device 20 can be the identical to the hardware configuration of each terminal device 10 described above, for example. Therefore, reference sings for components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are connected to one another by a data bus and/or a control bus.

The central processing unit 21, the main storage device 22, the input/output interface device 23, the input device 24, the auxiliary storage device 25, and the output device 26 can be substantially the identical to the central processing unit 11, the main storage device 12, the input/output interface device 13, the input device 14, the auxiliary storage device 15, and the output device 16, respectively, included in each of the terminal devices 10 described above.

With such hardware configuration, by sequentially loading, into the main storage device 22, the instructions and data (computer programs) constituting the specific application stored in the auxiliary storage device 25, and calculating the loaded instructions and data, the central processing unit 21 can control the output device 26 via the input/output interface device 23 or transmit/receive various pieces of data to/from other units (e.g., each terminal device 10) via the input/output interface device 23 and the communication line 2.

Therefore, the server device 20 can execute at least one of the following operations.

Operation of distributing the video transmitted by the terminal device 10 of each distributor to the terminal device 10 of each viewer Operation or the like (including various operations described later in detail) of transmitting token data and/or comment data transmitted by the terminal device 10 of each viewer to the terminal device 10 of a certain distributor to the terminal device 10 of the distributor Additionally, the server device 20 may include one or more microprocessors and/or graphics processing units (GPU) in place of the central processing unit 21 or together with the central processing unit 21.

2-3. Hardware Configuration of Studio Unit 30

As described above, the studio unit 30 can perform the similar function to that of the terminal device 10. Therefore, the studio unit 30 can have the similar hardware configuration to that of the terminal device 10 described above.

3. Functions of Each Device

Next, an example of the functions of each terminal device 10 and each server device 20 will be described.

3-1. Functions of Terminal Device 10

Figure 3:
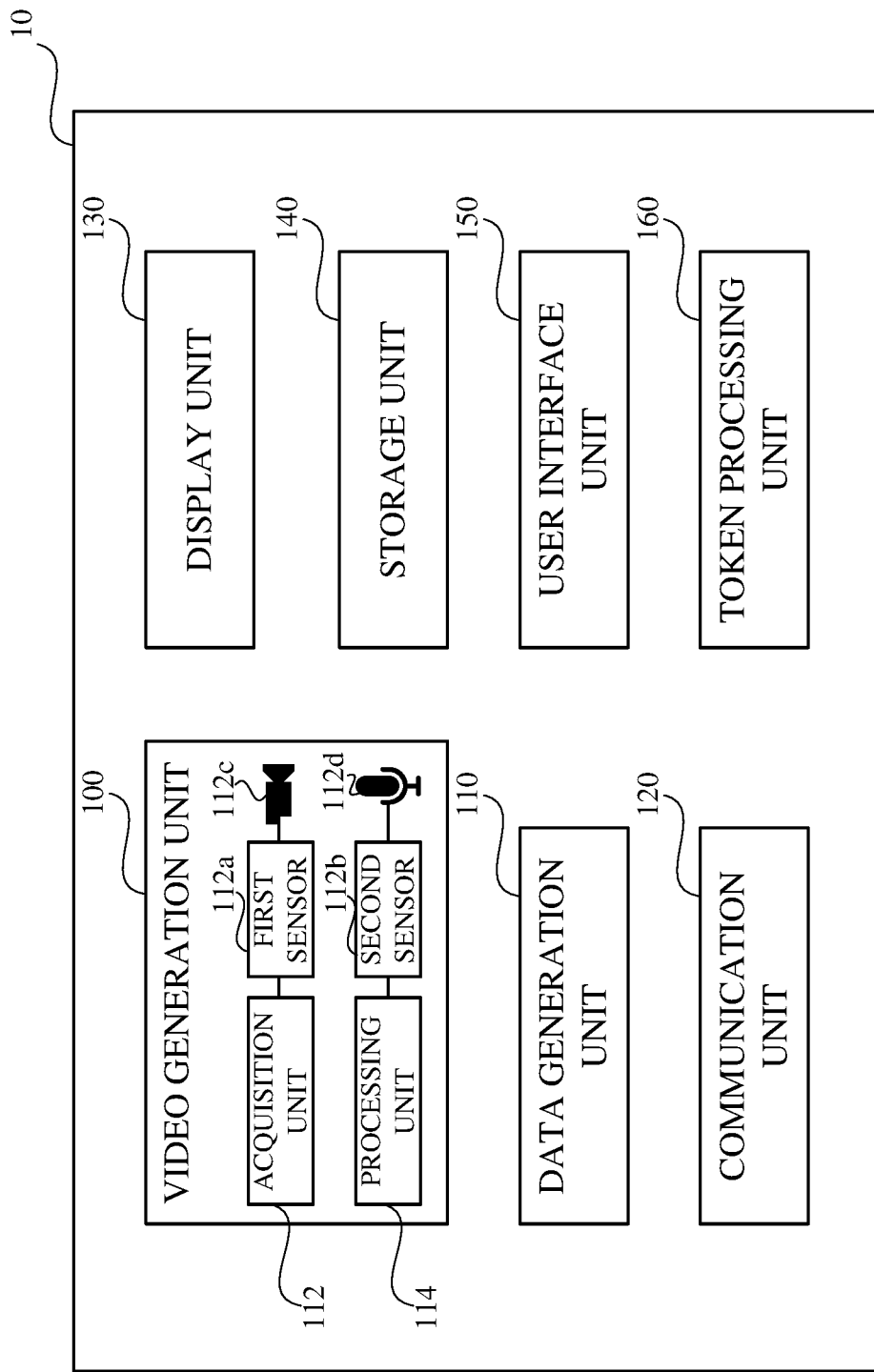
FIG. 3 is a block diagram schematically showing an example of the functions of the terminal device 10 shown in FIG. 1.

An example of the functions of the terminal device 10 will be described with reference to FIG. 3. FIG. 3 is a block diagram schematically showing an example of the functions of the terminal device 10 shown in FIG. 1.

As shown in FIG. 3, the terminal device 10 can mainly include a video generation unit 100, an data generation unit 110, a communication unit 120, a display unit 130, a storage unit 140, a user interface unit 150, and a token processing unit 160.

(1) Video Generation Unit 100

The video generation unit 100 can generate a video including animation of an avatar object of the distributor on the basis of motion data regarding the motion of a distributor. In order to achieve this, the video generation unit 100 can include, for example, an acquisition unit 112 and a processing unit 114.

The acquisition unit 112 can include one or more first sensors 112a that acquire data regarding the motion of the distributor, and one or more second sensors 112b that acquire audio data regarding an utterance (voice) and/or singing made by the distributor.

In a preferred embodiment, the first sensor 112a can includes an RGB camera 112c that images visible light and a near-infrared camera that images near-infrared light. As such camera, it is possible to use one included in True Depth camera of iPhone X, for example. The second sensor 112b can include a microphone 112d used for recording audio.

First, as for the first sensor 112a, the acquisition unit 112 images the body of the distributor using the first sensor 112a disposed close to the body of the distributor. This allows the acquisition unit 112 to generate data (e.g., an MPEG file) in which an image acquired by the RGB camera is recorded for a unit time in association with a time code (code indicating the acquired time). Furthermore, the acquisition unit 112 can generate data (e.g., a TSV file) in which a predetermined number (e.g., 51) of numerical values (e.g., numerical values of floating point numbers) indicating depths acquired by the near-infrared camera are recorded for a unit time in association with the time code. Here, the TSV file refers to a file in which a plurality of data are recorded with data separated by tabs.

As for the near-infrared camera, specifically, a dot projector radiates the body of the distributor with an infrared laser that forms a dot pattern, and the near-infrared camera captures the infrared dots projected and reflected on the body of the distributor, thereby generating an image of the captured infrared dots. By comparing the image of a dot pattern radiated by the dot projector registered in advance with the image captured by the near-infrared camera, the acquisition unit 112 can calculate the depth (distance between each point or each feature point and the near-infrared camera) of each point (each feature point) by using the positional deviation at each point (each feature point) (e.g., each of 51 points and feature points) in both images. The acquisition unit 112 can generate data in which the numerical value indicating the depth thus calculated is recorded for a unit time in association with the time code as described above.

Next, as for the second sensor 112b, the acquisition unit 112 acquires an audio regarding an utterance (voice) and/or singing made by the distributor using the second sensor 112b disposed close to the distributor. This allows the acquisition unit 112 to generate data (e.g., an MPEG file) recorded for a unit time in association with the time code. In one embodiment, the acquisition unit 112 can acquire data regarding the body of the distributor by using the first sensor 112a, and can acquire audio data regarding an utterance (voice) and/or singing made by the distributor by using the second sensor 112b. In this case, the acquisition unit 112 can generate data (e.g., an MPEG file) in which the image acquired by the RGB camera and the audio data regarding the utterance (voice) and/or singing made by the distributor by using the second sensor 112b are recorded for a unit time in association with the identical time code.

The acquisition unit 112 can output, to the processing unit 114, the data generated thereby (e.g., an MPEG file, a TSV file, or the like) regarding the motion of the distributor and/or the audio data (e.g., an MPEG file or the like) regarding the utterance (voice) and/or singing made by the distributor.

Additionally, although the case where the first sensor 112*a* includes the RGB camera and the near-infrared camera has been described here, the first sensor 112*a* may include any of the following (A) to (C), for example:

(A) A camera that detects infrared light radiated by infrared laser and reflected on the body of the distributor;

(B) A plurality of RGB cameras that image visible light; or (C) A single camera that images visible light.

In the case of (A) above, the acquisition unit 112 can calculate the depth of each feature point on the body of the distributor by the similar method to that described above. In the case of (B) above, the acquisition unit 112 can calculate the depth of each feature point on the body of the distributor by using a plurality of images imaged by the plurality of RGB cameras. In the case of (C) above, the acquisition unit 112 can calculate the depth of each feature point on the body of the distributor from the image imaged by the single camera by using deep learning or the like. In addition, in the case of (C) above, the acquisition unit 112 may calculate the depth of each feature point on the body of the distributor by analysis processing (image processing and the like) for the image imaged by the single camera.

The processing unit 114 can generate a video including animation of a virtual character (avatar object of the distributor) on the basis of the data regarding the motion of the distributor from the acquisition unit 112. As for the video itself of the virtual character, the processing unit 114 can generate the video of the virtual character by causing a rendering unit not shown to execute rendering using various pieces of data (e.g., geometry data, bone data, texture data, shader data, blend shape data, and the like) stored in a character data storage unit not shown.

Furthermore, by using various known techniques, the processing unit 114 can generate a video (e.g., a video in which the facial expression of the avatar object changes in synchronization with the movement of the mouth and eyes of the distributor, such as a video in which the facial expression of the avatar object changes in response to lip-sync and gaze tracking with the face of the performer) in which the (facial expression of) the avatar object is changed by using the data (data regarding the depth of each feature point on the body of the performer) regarding the motion of the distributor from the acquisition unit 112.

Additionally, as will be readily understood to a person of ordinary skill in the art having the benefit of the present disclosure, it is possible to adapt other suitable techniques in order to generate a video including animation of the avatar object of the distributor on the basis of motion data regarding the motion of the distributor.

Also, for example, the motion data can be acquired using a motion capture system. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be captured with image capture devices (such as an RGB camera having a CCD (charge-coupled device) or CMOS (complementary metal oxide semiconductor) image sensor) coupled to a computer that transforms the motion data into video or other image data.

(2) Data Generation Unit 110

The data generation unit 110 generates various pieces of data to be used by the terminal device 10 of each viewer, in order to reproduce an audio generated on the basis of the voice of the distributor and a video including animation of the avatar object generated on the basis of the motion of the distributor.

The various pieces of data can include the data shown in (a) to (d) below, for example.

(a) Data regarding the reference time, which changes with the passage of time and is used as a reference by the terminal device 10 of each viewer who reproduces the audio and video (hereinafter referred to as "reference time data").

(b) Data regarding the voice of the distributor (hereinafter referred to as "audio data"). This audio data can include a WAV file, an MP3 file, and the like, in which the voice of the distributor is recorded, for example.

(c) Data regarding the avatar object of the distributor (hereinafter referred to as "avatar data"). The avatar data can include, for example, identification data of the avatar object used by the distributor, and data regarding the coordinates, direction, and the like of the avatar object in the virtual space.

(d) Data regarding a token object corresponding to the token given to the distributor by each viewer (hereinafter referred to as "token object data"). The token object data can include, for example, identification data of the token object and data regarding the coordinates, direction, and the like of the token object in the virtual space.

(a) Reference Time Data

Figure 6:
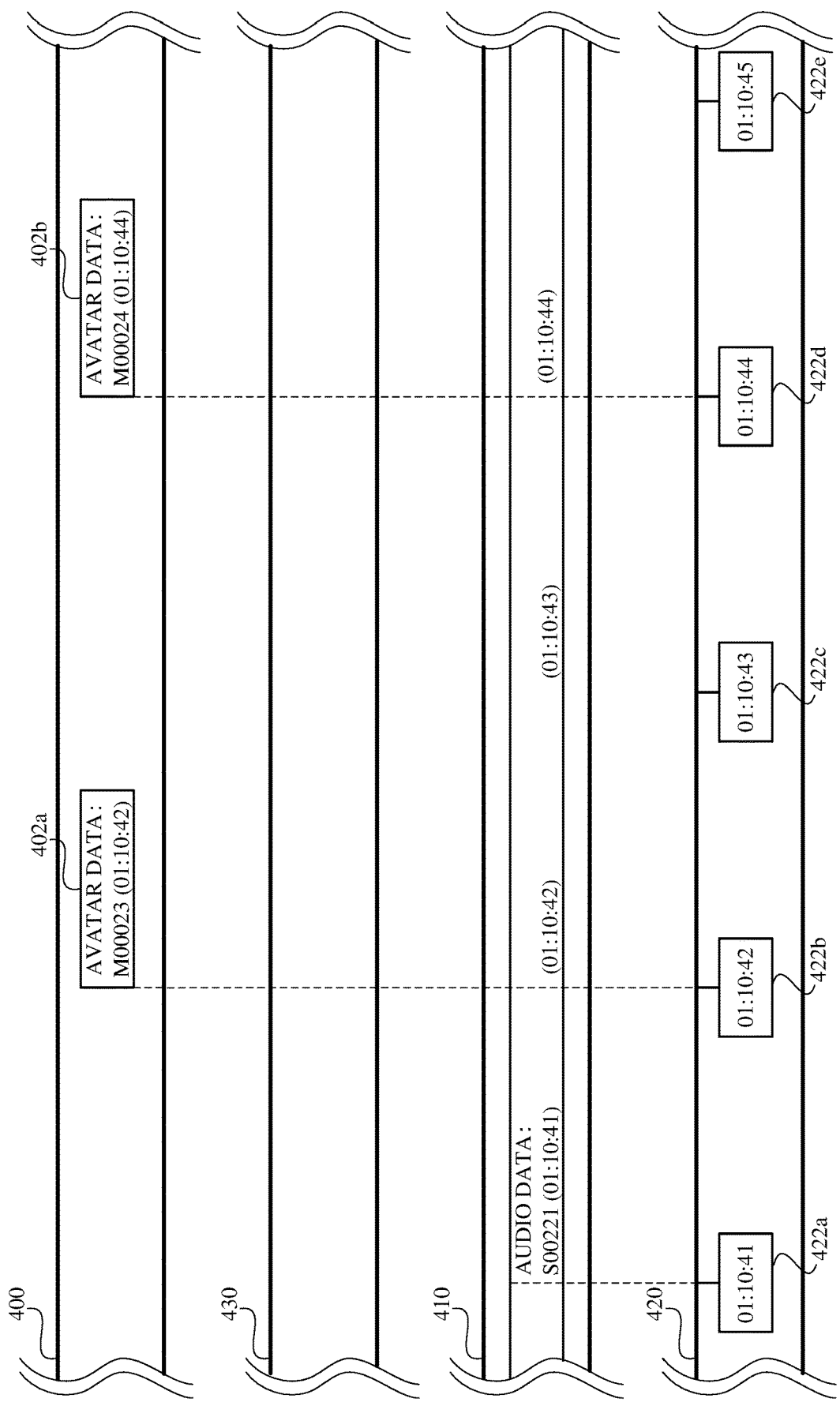
FIG. 6 is a schematic view conceptually showing an example of a method of reproducing a video and an audio by using data received by the terminal device 10 of each viewer in the video distribution system 1 shown in FIG. 1.

The data generation unit 110 can generate, as reference time data, an MPEG file or the like in which the reference time that changes with the passage of time is recorded, for example. By reproducing such an MPEG file or the like, the terminal device 10 of each viewer can acquire reference times such as "01:10:41" (1 hour 10 minutes 41 seconds), "01:10:42" (1 hour 10 minutes 42 seconds), "01:10:43" (1 hour 10 minutes 43 seconds), and so on that change with the passage of time as illustrated in FIG. 6, for example. Additionally, the data generation unit 110 can use, as reference time data, any other form of data in which the reference time that changes with the passage of time is recorded and the reference time is allowed to be referred to by the terminal device 10 of each viewer.

(b) Audio Data

The data generation unit 110 can generate, as audio data, an MPEG file, an MP3 file, or the like, for example, in which an audio signal regarding the voice of the distributor is recorded. The MPEG file may be an MPEG file generated by the acquisition unit 112 of the video generation unit 100 described above.

Furthermore, the data generation unit 110 can put a time stamp generated on the basis of the reference time to audio data such as an MPEG file at a predetermined time interval. The terminal device 10 of each viewer can acquire the reference time by reproducing such MPEG file or the like, and can reproduce the audio regarding the voice of the distributor synchronized with the reference time. Additionally, the time stamp may be the reference time used as it is, or may be the reference time extracted at each predetermined time interval.

(c) Avatar Data

The data generation unit 110 can include, in avatar data, identification data of the avatar object used by the distributor. This allows the terminal device 10 of each viewer to acquire an avatar object corresponding to the identification data from a plurality of avatar objects having been received and stored from the server device 20 or the like in advance.

Furthermore, the data generation unit 110 can include, in avatar data, the following data (i) to (iii) regarding the avatar object used by the distributor, for example.

(i) Data in which the coordinates of the avatar object in the virtual space, e.g., the coordinates in the x-axis (axis along the horizontal direction), the coordinates in the y-axis (axis along the depth direction), and the coordinates in the z-axis (axis along the vertical direction) are recorded for each unit time (avatar coordinate data)

It is possible to acquire such avatar coordinate data from the video generation unit 100 that generates the animation of an avatar object, for example.

Additionally, the coordinates of the avatar object in the virtual space may be determined with reference to a specific position. Here, the specific position can include an origin and/or an initial position.

By referring to the avatar coordinate data, the terminal device 10 of each viewer can determine the position of the avatar object in the virtual space for each unit time.

(ii) Data in which the direction (orientation) of the avatar object in the virtual space is stored for each unit time (avatar direction data)

The direction (orientation) of the avatar object can be determined, for example, by any of 0 to 359 degrees about an axis extending in the vertical direction (z-axis) in the virtual space (e.g., 0 degrees can be set when the avatar object faces the front, and 180 degrees can be set when the avatar object faces the back).

In another embodiment, the direction (orientation) of the avatar object may be determined by an angle (change amount) of rotation (change) in the right or left direction about the axis extending in the vertical direction (z-axis) with reference to a specific position (the initial position, origin, or the like) in the virtual space.

Such avatar direction data can be acquired from the video generation unit 100 that generates the animation of the avatar object, for example.

By referring to the avatar direction data, the terminal device 10 of each viewer can determine the direction (orientation) of the avatar object in the virtual space for each unit time. Additionally, the unit time applied to the avatar direction data may be identical to or different from the unit time applied to the avatar coordinate data.

(iii) Data (site data) in which the state of main sites of the avatar object is recorded for each unit time The main sites of the avatar object can include right eye, left eye, right eyebrow, left eyebrow, right cheek, left cheek, mouth, right ear, left ear, right hand, left hand, right foot, and/or left foot, without being limited thereto.

In the avatar site data, identification data of the site and state data indicating the state of the site can be recorded in association with each other at each unit time. For example, the state data associated with the site "right eye" can include any one of the pieces of data presented below without being limited thereto:

Data indicating a state in which the right eye is wide open and the black eye is at the right end;
Data indicating a state in which the right eye is wide open and the black eye is in the center;
Data indicating a state in which the right eye is wide open and the black eye is at the left end;
Data indicating a state in which the right eye is moderately open and the black eye is at the right end;
Data indicating a state in which the right eye is moderately open and the black eye is in the center;
Data indicating a state in which the right eye is moderately open and the black eye is at the left end; or
Data or the like indicating that the right eye is closed (data indicating any other state may be used).

Such avatar site data can be acquired from the video generation unit 100, which (recognizes the coordinates of the avatar object so that it) generates animation of the avatar object, for example.

By referring to the state data, the terminal device 10 of each viewer can determine the state of the site of the avatar object in the virtual space for each unit time. Additionally, the unit time applied to the avatar site data may be identical to or different from the unit time applied to the avatar coordinate data and/or the avatar direction data.

Furthermore, the data generation unit 110 can put a time stamp generated on the basis of the reference time to such avatar data at a predetermined time interval. At a timing synchronized with the time stamp included in received avatar data, data such as avatar coordinate data, avatar direction data, and site data that are included in the received avatar data can be applied to the terminal device 10 of each viewer. Additionally, the time stamp may be the reference time used as it is, or may be the reference time extracted at each predetermined time interval.

(d) Token Object Data (Gift Object Data)

The data generation unit 110 can include, in the token object data (gift object data), identification data of the avatar object corresponding to the token (gift) given to the distributor. This allows the terminal device 10 of each viewer to acquire a token object (gift object) corresponding to the identification data from a plurality of token objects having been received and stored from the server device 20 or the like in advance.

Furthermore, the data generation unit 110 can include, in the token object data, the data shown in the following (i) and (ii) regarding the token object, for example. Additionally, the data shown in (ii) can be used as an option.

(i) Data in which the coordinates of the token object in the virtual space, e.g., the coordinates in the x-axis (axis along the horizontal direction), the coordinates in the y-axis (axis along the depth direction), and the coordinates in the z-axis (axis along the vertical direction) are recorded for each unit time (token object coordinate data)

By referring to the token object coordinate data, the terminal device 10 of each viewer can determine the position of the token object in the virtual space for each unit time.

The motion of each token object may be predetermined. In this case, data indicating a rule (such as falling while rotating at a predetermined rate around the y-axis from the top to the bottom in the virtual space) regarding the motion of the token object can be stored in the storage unit 140 in association with the identification data of the token object. Hence, the data generation unit 110 can read out data showing the rule regarding the motion of the token object, by using the identification data of the token object as a retrieval key. The data generation unit 110 can generate token object coordinate data on the basis of the data having been read out in this manner.

(ii) Data in which the direction (orientation) of the token object in the virtual space is stored for each unit time (token object direction data)

The direction (orientation) of the token object can include a first direction that can be determined by any of 0 to 359 degrees about an axis extending in the vertical direction (e.g., the z-axis) in the virtual space, for example. For example, 0 degrees can be set when the token object faces the front, and 180 degrees can be set when the token object faces the back.

Furthermore, the direction (orientation) of the token object can include a second direction that can be determined by any of 0 to 359 degrees about an axis extending in the horizontal direction (e.g., the y-axis) in the virtual space, for example. For example, 0 degrees can be set when the vertex of the token object is positioned upward, and 180 degrees can be set when the vertex of the token object is positioned downward.

In addition, the direction (orientation) of the token object can include a third direction that can be determined by any of 0 to 359 degrees about an axis extending in the horizontal direction (e.g., the x-axis) in the virtual space, for example. For example, 0 degrees can be set when the face of the token object faces the front, and 180 degrees can be set when the face of the token object faces the bottom.

The motion of each token object may be predetermined. In this case, data indicating a rule (such as falling while rotating at a predetermined rate around the y-axis from the top to the bottom in the virtual space) regarding the motion of the token object can be stored in the storage unit 140 in association with the identification data of the token object. Hence, the data generation unit 110 can read out data showing the rule regarding the motion of the token object, by using the identification data of the token object as a retrieval key. The data generation unit 110 can generate token object direction data on the basis of the data having been read out in this manner.

By referring to the token object direction data, the terminal device 10 of each viewer can determine the direction (orientation) of the avatar object in the virtual space for each unit time. Additionally, the unit time applied to the token object direction data may be identical to or different from the unit time applied to the token object coordinate data.

Furthermore, the data generation unit 110 can put a time stamp generated on the basis of the reference time to such token object data at a predetermined time interval. At a timing synchronized with the time stamp included in received token object data, token object coordinate data and token object direction data that are included in the received token object data can be applied to the terminal device 10 of each viewer. Additionally, the time stamp may be the reference time used as it is, or may be the reference time extracted at each predetermined time interval.

(3) Communication Unit 120

The communication unit 120 can communicate various pieces of data used for distribution and/or viewing of videos with the server device 20. When the terminal device 10 operates as the terminal device of the distributor, the communication unit 120 transmits a video to the server device 20, and can receive, from the server device 20, the token data and/or comment data transmitted to the distributor. Furthermore, when the terminal device 10 operates as the terminal device of the viewer, the communication unit 120 can receive, from the server device 20 the video transmitted by the terminal device 10 of the distributor, and can transmit, to the server device 20, token data and/or comment data to the distributor.

(4) Display Unit 130

The display unit 130 can display various pieces of data used for distribution and/or viewing of the video. For example, when the terminal device 10 operates as the terminal device 10 of the distributor, the display unit 130 can display a video including the animation of the avatar object of the distributor received from the video generation unit 100. Furthermore, when the terminal device 10 operates as the terminal device 10 of the viewer, the display unit 130 can display a video including the animation of the avatar object of the distributor by using various data received from the terminal device 10 of the distributor via the server device 20.

(5) Storage Unit 140

The storage unit 140 can store various pieces of data used for distribution and/or viewing of the video.

(6) User Interface Unit 150

The user interface unit 150 can input, via a user operation, various data used for distribution and/or viewing of a video.

(7) Token Processing Unit 160

The token processing unit 160 can process token data transmitted/received regarding distribution and/or viewing of a video. For example, when the terminal device 10 operates as the terminal device 10 of the distributor, the token processing unit 160 can process the token data transmitted to the distributor. When the terminal device 10 operates as the terminal device 10 of the viewer, the token processing unit 160 can process the token data transmitted by the viewer.

3-2. Functions of Server Device 20

Figure 4:
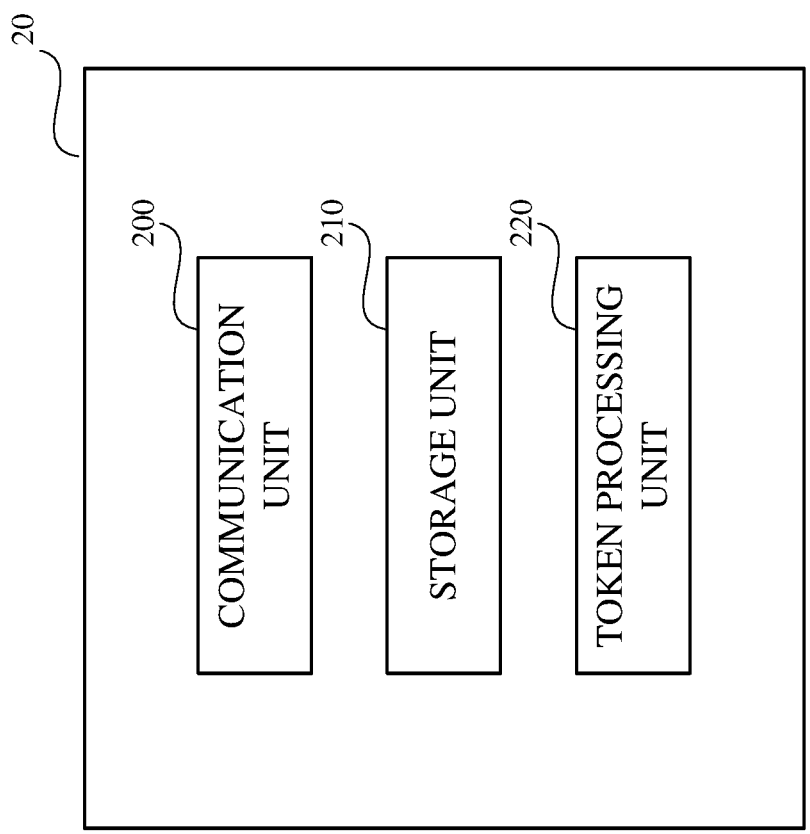
FIG. 4 is a block diagram schematically showing an example of the function of the server device 20 shown in FIG. 1.

An example of the function of the server device 20 will be described with reference to FIG. 4. FIG. 4 is a block diagram schematically showing an example of the function of the server device 20 shown in FIG. 1. As shown in FIG. 4, the server device 20 can include a communication unit 200, a storage unit 210, and a token processing unit 220.

The communication unit 200 can communicate various pieces of data used for distribution and/or viewing of videos with the terminal device 10 of the distributor and/or the terminal device 10 of the viewer.

The storage unit 210 can store various pieces of data used for distribution and/or viewing of the video.

The token processing unit 220 can process the token data transmitted from each viewer to each distributor.

3-3. Functions of Studio Unit 30

As described above, the studio unit 30 can perform the similar function to that of the terminal device 10. Therefore, the studio unit 30 can have the function of the terminal device 10 described with reference to FIG. 3.

4. Operations of Video Distribution System 1

Figure 5:
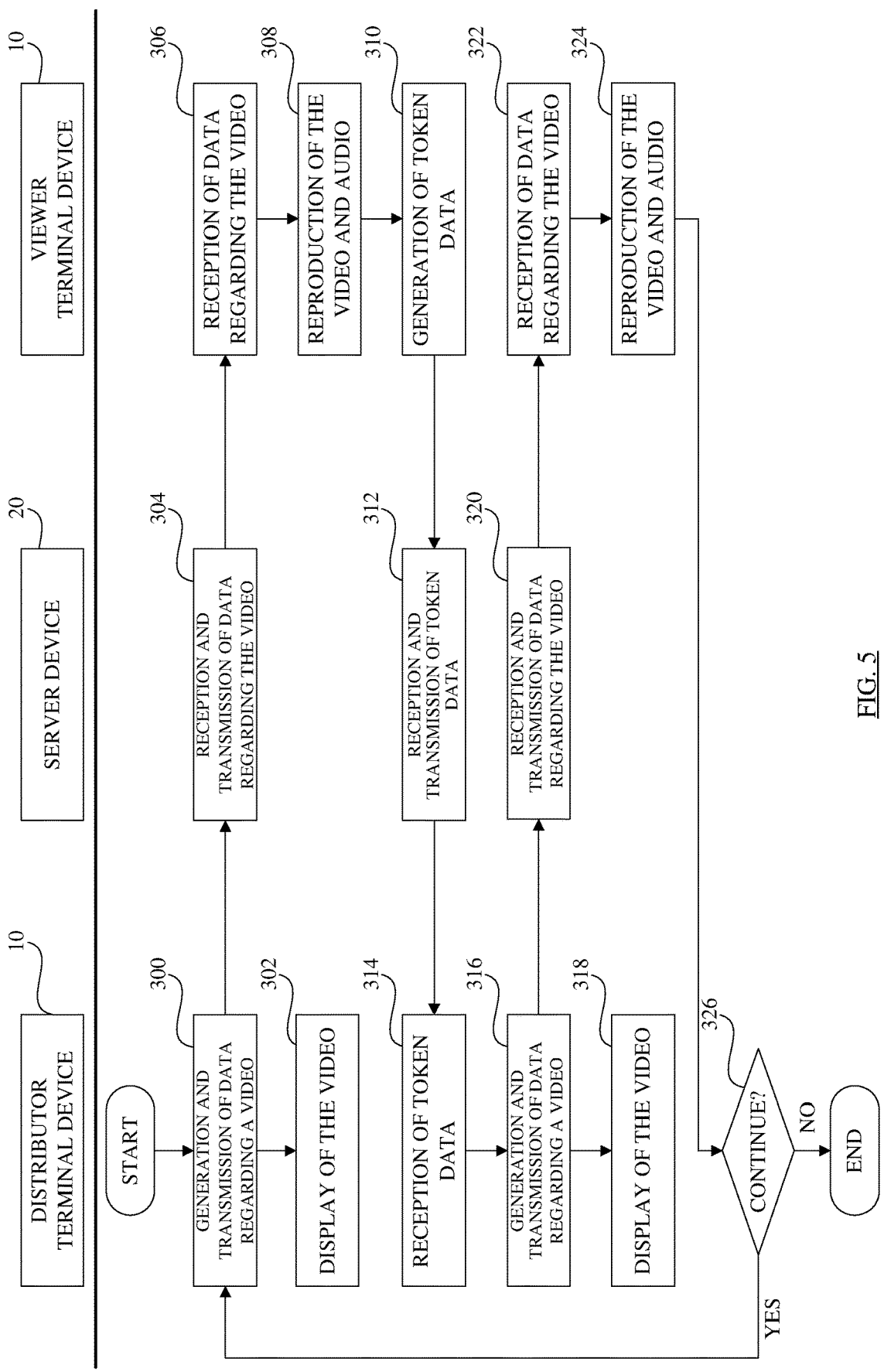
FIG. 5 is a flowchart showing an example of the operations performed in the video distribution system 1 shown in FIG. 1.

FIG. 5 is a flowchart showing an example of the operations performed in the video distribution system 1 shown in FIG. 1. Additionally, FIG. 5 shows, in the left part, the operations performed by the terminal device 10 of at least one distributor. Also, FIG. 5 shows, in the center part, the operations performed by the server device 20 (here, one server device 20), and shows, in the right part, the operations performed by the terminal device 10 of at least one viewer.

First, the distributor starts the video distribution application in the terminal device 10, thereby starting the operations in the video distribution system 1.

In step (hereinafter referred to as "ST") 300, the distributor carries out a performance with the terminal device 10 facing himself/herself. This allows the video generation unit 100 of the terminal device 10 of the distributor to generate a video including the animation of the avatar object of the distributor and an audio signal regarding the voice of the distributor.

The data generation unit 110 of the terminal device 10 of the distributor can generate various pieces of data to enable the terminal device 10 of each viewer to reproduce the video and the audio. The various pieces of data can include, for example, reference time data, audio data, and avatar data, as described in "3-1(2)" above.

Furthermore, the communication unit 120 of the terminal device 10 of the distributor transmits such various pieces of data to the server device 20. The various pieces of data may be mutually multiplexed by any multiplex method and transmitted to the server device 20 as long as the condition that the correspondence relationship between the data to be transmitted (having been transmitted) and the time stamp based on the reference time is clear in both the terminal device 10 of the distributor and the terminal device 10 of the viewer is satisfied. If such condition is satisfied, when receiving the various pieces of data, the terminal device 10 of each viewer can appropriately process each piece of the transmitted data in accordance with the time stamp corresponding to each of them. As for the multiplex method, avatar data 400, audio data 410, reference time data 420, and token object data 430, which will be described later, may be transmitted via different channels, or a plurality of these pieces of data may be transmitted via the identical channel. These channels can include a time slot, a frequency band, and/or a spread code.

Next, in parallel with the operations in ST300, the display unit 130 of the terminal device 10 of the distributor can display in ST302 the video generated by the video generation unit 100 as feedback to the distributor.

The terminal device 10 of the distributor can perform the operations in ST300 and ST302 in parallel with the operations in ST304 to ST314 described below.

Next, in ST304, the server device 20 can distribute, to the terminal device 10 of each viewer, the various pieces of data continuously transmitted from the terminal device 10 of the distributor. The terminal device 10 of each viewer executes the video view application.

In ST306, the communication unit 120 of the terminal device 10 of each viewer can receive the various pieces of data from the server device 20 and store the various data in the storage unit 140. In one embodiment, in consideration of the possibility that the audio data has a larger capacity than other data has and/or the possibility that a failure occurs in the communication line 2, the terminal device 10 of each viewer can temporarily store (buffer), in the storage unit 140, the various pieces of data received from the server device 20.

In parallel with receiving and storing such various pieces of data, the display unit 130 of the terminal device 10 of each viewer can reproduce in ST308 videos and audios by using the various pieces of data received and stored via the server device 20 from the terminal device 10 of the distributor.

FIG. 6 is a schematic view conceptually showing an example of a method of reproducing a video and an audio by using data received by the terminal device 10 of each viewer in the video distribution system 1 shown in FIG. 1. As shown in FIG. 6, the terminal device 10 of each viewer can receive the avatar data 400, the audio data 410, and the reference time data 420. Additionally, in the example shown in FIG. 6, the terminal device 10 of each viewer does not receive token object data at this time.

The display unit 130 of the terminal device 10 of each viewer can sequentially read out the reference time data 420 stored in the storage unit 140 and process the reference time data 420 having been read out. Specifically, for example, when the reference time data 420 is an MPEG file or the like, by reproducing the MPEG file or the like, the display unit 130 can acquire a reference time 422, which changes with the passage of time. As some of such reference time 422, FIG. 6 illustrates a reference time 422*a* of "01:10:41" (1 hour 10 minutes 41 seconds), a reference time 422*b* of "01:10:42" (1 hour 10 minutes 42 seconds), a reference time 422*c* of "01:10:43" (1 hour 10 minutes 43 seconds), a reference time 422*d* of "01:10:44" (1 hour 10 minutes 44 seconds), and a reference time 422*e* of "01:10:45" (1 hour 10 minutes 45 seconds). That is, FIG. 6 shows an example in which the reference time 422 is obtained for every one second.

Furthermore, the display unit 130 can sequentially read out the audio data 410 stored in the storage unit 140 and process the audio data 410 having been read out. FIG. 6 shows an example in which the audio data 410 includes continuously connected data. A time stamp is put to such the audio data 410 at a predetermined time interval (every one second here). FIG. 6 shows an example in which time stamps of "01:10:41" (1 hour 10 minutes 41 seconds), "01:10:42" (1 hour 10 minutes 42 seconds), "01:10:43" (1 hour 10 minutes 43 seconds), "01:10:44" (1 hour 10 minutes 44 seconds), and so on are put to the audio data 410.

The display unit 130 can reproduce an audio signal corresponding to each time stamp included in the audio data 410 at a timing at which each time stamp included in the audio data 410 matches or substantially matches the reference time 422 acquired from the reference time data 420. That is, the display unit 130 can reproduce the audio signal corresponding to each time stamp included in the audio data 410 while synchronizing each time stamp included in the audio data 410 with the reference time 422 included in the reference time data 420.

Furthermore, the display unit 130 can sequentially read out the avatar data 400 stored in the storage unit 140 and process the avatar data 400 having been read out. FIG. 6 shows an example of the mutually separated avatar data 400 such as avatar data 402*a* to which identification data "M00023" is given and avatar data 402*b* to which identification data "M00024" is given. The reason why the plurality of pieces of avatar data 400 is thus not continuously connected but mutually separated is that the avatar data 400 is generated for each unit time (here, every two seconds) as described above.

FIG. 6 shows the avatar data 402*a* to which the time stamp of "01:10:42" (1 hour 10 minutes 42 seconds) is put and the avatar data 402*b* to which the time stamp of "01:10:44" (1 hour 10 minutes 44 seconds) is put.

The display unit 130 can apply the avatar coordinate data, the avatar direction data, and the site data included in the avatar data 402*a* at the timing at which the time stamp (01:10:42) included in the avatar data 402*a* matches or substantially matches the reference time 422*b* (01:10:42) included in the reference time data 420. That is, the display unit 130 can apply the avatar coordinate data, the avatar direction data, and the site data included in the avatar data 402*a* while synchronizing the time stamp (01:10:42) included in the avatar data 402*a* with the reference time 422*b* (01:10:42) included in the reference time data 420.

By applying the avatar coordinate data, the avatar object identified by the identification data included in the avatar data 402*a* can be disposed at the coordinate specified by the avatar coordinate data. By applying the avatar direction data, the avatar object can be rotated in a direction specified by the avatar direction data. By applying the site data, the state of each site in the avatar object can be changed to a state specified by the site data.

Also as for the avatar data 402*b*, similarly to the avatar data 402*a*, the display unit 130 can apply the avatar coordinate data, the avatar direction data, and the site data included in the avatar data 402*b* while synchronizing the time stamp (01:10:44) included in the avatar data 402b with the reference time 422b (01:10:44) included in the reference time data 420.

Thus, as illustrated in FIG. 8, the display unit 130 can generate animation in which an avatar object 450 of the distributor specified by the avatar data (generated for each unit time, for example) operates in a virtual space 460 on the basis of the avatar coordinate data, the avatar direction data, and the site data (generated for each unit time, for example).

Next, referring back to FIG. 5, in parallel with the operations in ST306 and ST308 described above, each viewer viewing the video distributed by the terminal device 10 of the distributor can transmit in ST310 token/gift data indicating that a token/gift is given to the distributor by using the terminal device 10. Such token/gift data can include, for example, identification data of a token/gift to be given, identification data of the distributor, and identification data of the viewer. Such token/gift data are transmitted to the server device 20 by the terminal device 10 of the viewer.

In ST312, the server device 20 transmits the token/gift data received from the terminal device 10 of each viewer to the terminal device 10 of the distributor corresponding to the identification data of the distributor included in the token/gift data.

In ST314, the terminal device 10 of the distributor can receive via the server device 20 the token/gift data transmitted to the distributor himself/herself by the terminal device 10 of each viewer.

In ST316, the terminal device 10 of the distributor can perform the similar operations to those in ST300 basically. In addition, on the basis of the token/gift data received in ST314, the terminal device 10 of the distributor can also generate the token/gift object data described in "3-1(2)(d)" (token/gift object coordinate data alone, or token/gift object coordinate data and token/gift object direction data).

Next, in ST320 and ST322, the terminal device 10 of each viewer can perform the similar operations to those in ST304 and ST306, respectively, described above. However, the various pieces of data transmitted from the terminal device 10 of the distributor via the server device 20 to the terminal device 10 of each viewer can include the token/gift object data generated on the basis of the token/gift data in ST316 described above.

Next, in ST324, the terminal device 10 of each viewer can perform the similar operations to those in ST308 described above basically. In addition, the terminal device 10 of each viewer can reproduce videos and audios by using various data including the token/gift object data received and stored from the terminal device 10 of the distributor via the server device 20.

Figure 7:
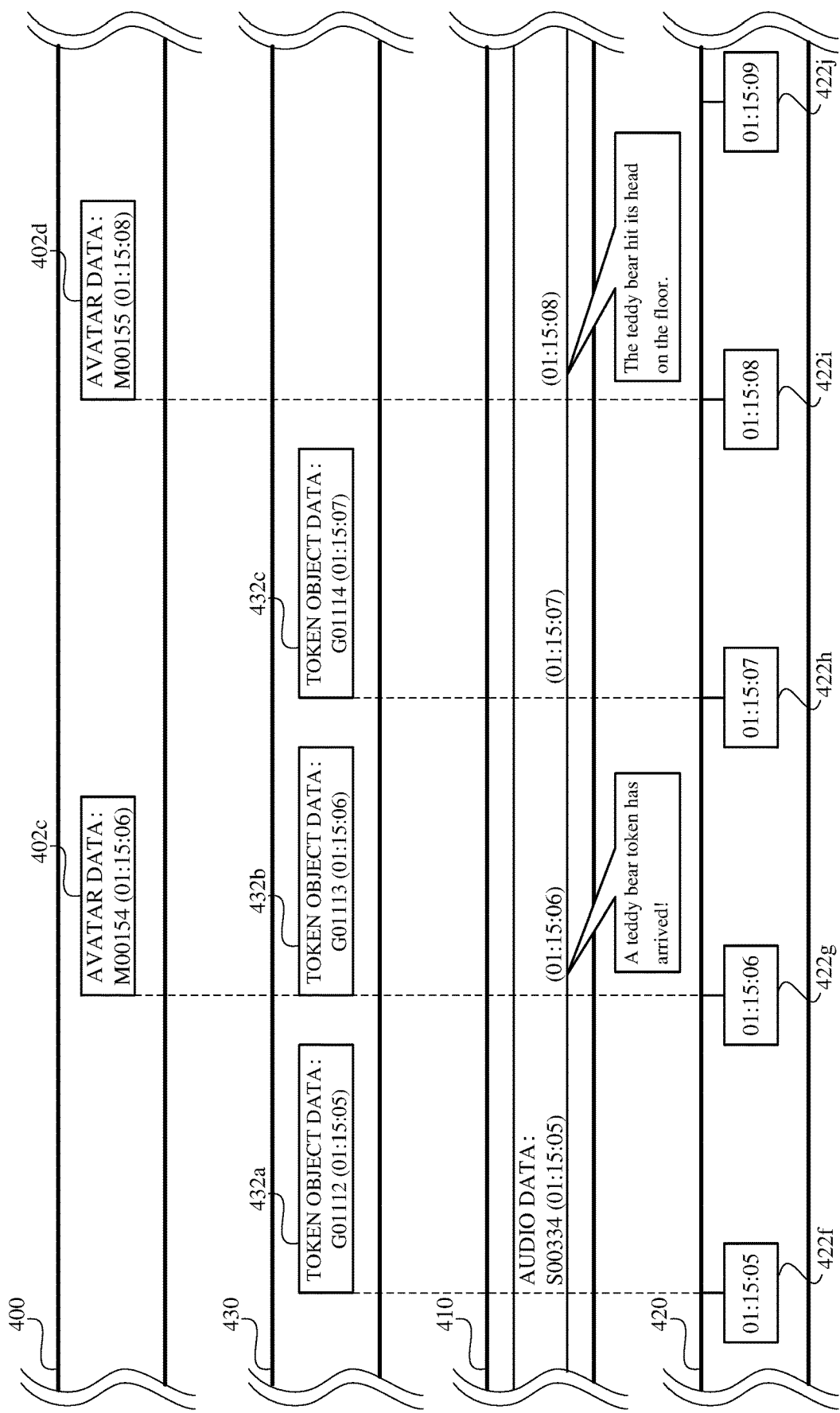
FIG. 7 is a schematic view conceptually showing another example of a method of reproducing a video and an audio by using data received by the terminal device 10 of each viewer in the video distribution system 1 shown in FIG. 1.

FIG. 7 is a schematic view conceptually showing another example of a method of reproducing a video and an audio by using data received by the terminal device 10 of each viewer in the video distribution system 1 shown in FIG. 1. As shown in FIG. 7, the terminal device 10 of each viewer can receive the avatar data 400, the audio data 410, and the reference time data 420, as well as the token object data 430.

How the terminal device 10 of each viewer uses the reference time data 420, the audio data 410, and the avatar data 400 has been described above in relation to ST308, and hence the description thereof is omitted here.

The display unit 130 can sequentially read out the token object data 430 stored in the storage unit 140 and process the token object data 430 having been read out. FIG. 7 shows an example of the mutually separated token object data 430 such as token object data 432a to which identification data "G01112" is given, token object data 432b to which iden-tification data "G01113" is given, and token object data 432c to which identification data "G01114" is given. The reason why the plurality of pieces of token object data 430 is thus not continuously connected but mutually separated is that the token object data 430 is generated for each unit time (here, every one second) as described above.

FIG. 7 shows the token object data 432a to which the time stamp of "01:15:05" (1 hour 15 minutes 05 seconds) is put, the token object data 432b to which the time stamp of "01:15:06" (1 hour 15 minutes 06 seconds) is put, and the token object data 432c to which the time stamp of "01:15:07" (1 hour 15 minutes 07 seconds) is put.

The display unit 130 can apply the token object coordinate data and the token object direction data included in the token object data 432a at the timing at which the time stamp (01:15:05) included in the token object data 432a matches or substantially matches a reference time 422f (01:15:05) included in the reference time data 420. That is, the display unit 130 can apply the token object coordinate data and the token object direction data included in the token object data 432a while synchronizing the time stamp (01:15:05) included in the token object data 432a with the reference time 422f (01:15:05) included in the reference time data 420.

By applying the token object coordinate data, the token object identified by the identification data included in the token object data 432a can be disposed at the coordinate specified by the token object coordinate data. By applying the token object direction data, the token object can be rotated in a direction specified by the token object direction data.

Also as for the token object data 432b, similarly to the token object data 432a, the display unit 130 can apply the token object coordinate data and the token object direction data included in the token object data 432b while synchronizing the time stamp (01:15:06) included in the token object data 432b with a reference time 422g (01:15:06) included in the reference time data 420. The token object data 432c can also be understood similarly to the token object data 432a and the token object data 432b.

Thus, as illustrated in FIG. 8, the display unit 130 can generate animation in which a token object 500 specified by the token object data (generated for each unit time, for example) operates in the virtual space 460 on the basis of the token object coordinate data and the token object direction data (generated for each unit time, for example).

Specifically, the display unit 130 can generate animation in which a token object 500A is disposed in accordance with the coordinates and direction specified by the token object data 432a at the reference time (01:15:05). The display unit 130 can generate animation in which a token object 500B is disposed in accordance with the coordinates and direction specified by the token object data 432b at the reference time (01:15:06). The display unit 130 can generate animation in which a token object 500C is disposed in accordance with the coordinates and direction specified by the token object data 432c at the reference time (01:15:07). Due to this, after about one second from the point of time when the token object 500A (500) is displayed, the display unit 130 can display the token object 500B (500) fell with the direction rotated by 90 degrees around the y-axis, and, after about one second from the point of time, the display unit 130 can display the token object 500C (500) fell with the direction further rotated by 90 degrees around the y-axis.

Referring to FIG. 7, to the token object data 432a, the token object data 432b, and the token object data 432c, a time stamp based on the reference time 422f (01:15:05), a time stamp based on the reference time 422g (01:15:06), and a time stamp based on a reference time 422h (01:15:07), respectively, are put. Similarly, also in the audio data 410, a time stamp based on the reference time 422g (01:15:06) is put to the audio signal "A teddy bear token has arrived!", and a time stamp based on a reference time 422i (01:15:08) is put to the audio signal "The teddy bear hit its head on the floor."

Therefore, in the terminal device 10 of each viewer using the data, immediately after the token object 500A (500) appears in the video, the audio of the distributor "A teddy bear token has arrived!" is reproduced. Immediately after the token object 500C comes into contact with the floor in the video, the audio of the distributor "The teddy bear hit its head on the floor" is reproduced.

Additionally, FIG. 7 shows an example in which the time interval (1 second) between the time stamp put to the token object data 432a and the time stamp put to the token object data 432b is the identical to the time interval (1 second) between the time stamp put to the token object data 432b and the time stamp put to the token object data 432c. However, in another embodiment, these time intervals may be either identical or different. This is also applicable to the relationship between the time interval (2 seconds) between the time stamp put to avatar data 402c and the time stamp put to avatar data 402d and the time interval between the time stamp put to the avatar data 402d and the time stamp put to avatar data 402e (not shown).

Returning to FIG. 5, in ST326, it is determined whether or not to continue the processing. If it is determined to continue the processing, the processing returns to ST300 described above. On the other hand, if it is determined not to continue the processing, the processing ends.

5. Variations

In the various embodiments described above, as illustrated in FIG. 8, when a token is given by a viewer to a distributor, only the token object 500 corresponding to the token is displayed in the video distributed from the terminal device 10 of the distributor to the terminal device 10 of each viewer. In another embodiment, when a token is given to a distributor by a viewer, the video distributed from the terminal device 10 of the distributor to the terminal device 10 of each viewer may display data regarding the viewer who has given the token, in combination with the token object 500 corresponding to the token. As an example of data regarding the viewer who has given the token, in FIG. 8, a name or handle 300A of the viewer can be used. Alternatively or additionally, at least a part (not shown) of the avatar object of the viewer may be used. In order to realize this, for example, the terminal device 10 of the distributor can include, in the token object data, data regarding the viewer who has given the token.

Thus, for each viewer, data regarding himself/herself is displayed in accordance with the operation of giving the token to the distributor by himself/herself, in the video distributed by the distributor. As a result, it is possible to motivate each viewer to positively give the distributor a token.

Even when a large number of token objects are displayed in the video distributed by the distributor, data regarding the viewer corresponding to each piece of at least some of token objects is displayed in combination with at least some of the token objects of the large number of token objects, whereby each of the viewers can quickly and surely identify the token object corresponding to the token given to the distributor by himself/herself from among the large number of token objects.

In the various embodiments described above, a case where the avatar data 400 is generated for each unit time regardless of the presence/absence of a change in the motion of the distributor has been described. In another embodiment, in order to further suppress the amount of data transmitted from the terminal device 10 of the distributor to the terminal device 10 of each viewer, the avatar data 400 may be generated for each unit time and/or at any time only for a period in which a change occurred in the motion of the distributor.

Furthermore, in the various embodiments described above, in consideration of high possibility that the distributor continues to make a voice during distribution of the video, the case where the audio data 410 takes a continuously connected form (e.g., an MPEG file or the like) has been described. In another embodiment, the audio data 410 may be generated only for the period in which the distributor made the voice. Even in this case, it is preferable that a time stamp based on the reference time is put to each piece of generated audio data for each unit time and/or at any time.

Furthermore, the example illustrated in FIG. 8 illustrates that a token is given, as a means for transmitting the response to the video distributed by the distributor from each viewer. In addition to this or in place of this, it is also possible to adopt a method of transmitting comment data indicating a comment regarding the distributor and/or the video from the terminal device 10 of each viewer to the terminal device 10 of the distributor via the server device 20.

Such comment data can include, for example, the following data:

Data indicating the contents of the comment;
Identification data of the distributor who is the recipient of the comment data; or
Identification data of the viewer who is the source of the comment data.

Such comment data is transmitted from the terminal device 10 of each viewer to the server device 20. The server device 20 transmits comment data to the terminal device 10 of the distributor on the basis of identification data of the distributor included in the comment data. The terminal device 10 of the distributor can generate comment reference data on the basis of the received comment data.

The comment reference data can include, for example, the following data:

Data indicating the contents of the comment; or
Data regarding the viewer who transmitted the comment data (name, handle, and/or at least part of avatar object).

A time stamp based on the reference time can also be put to such comment data, similar to the token object data described above.

The terminal device 10 of each viewer that has received such comment reference data can apply this comment reference data by a similar method to that of the token object data described above. Thus, the display unit 130 of the terminal device 10 of the viewer can process and display the comment reference data while synchronizing the comment reference data with the received reference data.

In the various embodiments described above, as a preferred embodiment, the case where a time stamp based on the reference data is also put to the avatar data 400 has been described. In another embodiment, for example, when it is not necessary to accurately synchronize the motion of the avatar object of the distributor with the audio based on the voice of the distributor, it is not necessary to put a time stamp based on the reference time to the avatar data 400.

Furthermore, in the various embodiments described above, as a preferred embodiment, the case where a time stamp based on the reference time is always put to the audio data 410 for each unit time or any time has been described. In another embodiment, only at a timing when it becomes necessary to transmit the token object data 430 due to the token being given to the distributor, a time stamp based on the reference time may be put to the audio data 410 for each unit time or any time. Due to this, each time receiving the token object data 410, the terminal device 10 of each viewer can process the token object data 410 while synchronizing the token object data 410 with the audio data 420 on the basis of the time stamp put to the token object data 410.

Furthermore, in the various embodiments described above, as a preferred embodiment, the case where the token object data 430 includes the identification data of the token object, the token object coordinate data, and the token object direction data has been described. In another embodiment, the token object data 430 can include only the identification data of the token object and the token object coordinate data (token object direction data can be used as an option).

Additionally, in the various embodiments described above, the case where the terminal device 10 of the distributor transmits, to the terminal device 10 of each viewer, data (avatar object data) regarding the avatar object generated on the basis of the motion data of the distributor, whereby the terminal device 10 of each viewer generates a video including animation of the avatar object on the basis of the avatar object data has been described. In another embodiment, the terminal device 10 of the distributor transmits the motion data of the distributor to the terminal device 10 of each viewer, whereby the terminal device 10 of each viewer can also generate a video including animation of the avatar object on the basis of the motion data. In this case, it is necessary that a time stamp based on the reference data be put, for each unit time or any time, to the motion data transmitted from the terminal device 10 of the distributor to the terminal device 10 of each viewer. Additionally, the video generation unit 100 of the terminal device 10 of each viewer can generate a video including animation of the avatar object by a similar method to that described in the above "3-1(1)".

In the above description, a sentence "a time stamp based on reference time is put to token object data and the like" corresponds to that "the token object data is associated with the reference time".

In the various embodiments described above, the operations of each terminal device 10 described above can be executed also by the studio unit 30 having the similar configuration to that of this terminal device 10.

Additionally, the various embodiments described above can be implemented in combination with one another as long as no conflict occurs.

As described above, in the various embodiments disclosed in the present application, without transmitting a video from the terminal device 10 of the distributor to the terminal device 10 of each viewer, the terminal device 10 of each viewer can reproduce a video including animation of the avatar object based on the motion of the distributor. Hence, it is possible to suppress the amount of data transmitted from the terminal device 10 of the distributor to the terminal device 10 of each viewer. This allows the terminal device 10 of each viewer to reproduce the video while suppressing the influence caused by the failure occurring in the communication network 2.

Furthermore, the terminal device 10 of each viewer can receive from the terminal device 10 of the distributor the token object data 430 and the audio data 420 to which a time stamp based on the reference time is put, and can synchronize both the display of the token object and the reproduction of the audio with the identical reference time. Thus, the terminal device 10 of each viewer can synchronize the display of a token object with the reproduction of an audio. Such synchronization is hardly affected by whether or not a failure is occurring in the communication network 2 and whether or not the terminal device 10 of each viewer buffers and reproduces the audio data 420.

Therefore, according to the various embodiments disclosed in the present application, it is possible for the terminal device of each viewer to at least in part suppress the deviation between the timing of reproducing an audio and the timing of drawing an object corresponding to the token.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. Non-transitory computer-readable storage media storing computer-readable instructions, which when executed by a computer having at least one processor, cause the computer to:
   generate a video including an animation of an avatar object of a distributor generated on the basis of motion data regarding a motion of the distributor and an animation of a token object given by a first viewer to the distributor operating according to a predetermined rule, the first viewer being associated with a first viewer terminal; and
   transmit, toward a plurality of viewer terminals via a communication line, coordinate data including data regarding coordinates of the token object associated with a reference time, the plurality of viewer terminals comprising the first viewer terminal, and audio data regarding a voice of the distributor associated with the reference time, in order to cause each of the plurality of viewer terminals to generate a video including an animation of the avatar object and the token object, wherein:
      in the video generated by each of the plurality of viewer terminals, the token object can be disposed in accordance with the data regarding the coordinates of the token object associated with the reference time,
      the avatar object is displayed to operate in synchronization with the motion of the distributor,
      data regarding the viewer who has given the token object to the distributor are displayed in connection with the token object,
      the animation of the avatar object generated by the computer is the same as the animation of the avatar object generated by each of the plurality of viewer terminals, and
      the animation of the token object generated by the computer is the same as the animation of the token object generated by each of the plurality of viewer terminals.

2. The non-transitory computer-readable storage media according to claim 1, wherein the coordinate data include data regarding coordinates of the avatar object associated with the reference time.

3. The non-transitory computer-readable storage media according to claim 2, wherein the coordinate data include:
   data regarding coordinates of the avatar object corresponding to a first time of the reference time;

data regarding coordinates of the avatar object corresponding to a second time of the reference time occurring after the first time; and data regarding coordinates of the avatar object corresponding to a third time of the reference time occurring after the second time.

4. The non-transitory computer-readable storage media according to claim 1, wherein the instructions further cause the computer to:

transmit, toward the plurality of viewer terminals, the motion data associated with the reference time.

5. The non-transitory computer-readable storage media according to claim 1, wherein the instructions further cause the computer to:

transmit, toward the plurality of viewer terminals, identification data identifying the token object.

6. The non-transitory computer-readable storage media according to claim 1, wherein the instructions cause the computer to:

transmit the audio data regarding the voice of the distributor associated with the reference time only when the computer needs to send the data regarding the coordinates of the token object in response to receiving the token object from the viewer terminal; and transmit the audio data regarding the voice of the distributor which are not associated with the reference time when the computer does not need to send any data regarding coordinates of any token object.

7. The non-transitory computer-readable storage media according to claim 1, wherein the coordinate data include data regarding coordinates of the avatar object associated with the reference time when the avatar object needs to operate in synchronization with the audio data in the video generated by each of the plurality of viewer terminals, and wherein the coordinate data include data regarding coordinates of the avatar object which is not associated with the reference time when the avatar object does not need to operate in synchronization with the audio data in the video generated by each of the plurality of viewer terminals.

8. The non-transitory computer-readable storage media according to claim 2, wherein the coordinate data include data regarding coordinates of the avatar object only for a period during which a change has occurred in the motion of the distributor.

9. A computer-implemented method for automatically generating customized video in an interactive network application, the method comprising: with at least one processor:

generating a video including an animation of an avatar object of a distributor generated on the basis of motion data regarding a motion of the distributor and an animation of a token object given by a first viewer to the distributor operating according to a predetermined rule, the first viewer being associated with a first viewer terminal; and transmitting, toward a plurality of viewer terminals including the first viewer terminal via a communication line, coordinate data including data regarding coordinates of the token object associated with a reference time, and audio data regarding a voice of the distributor associated with the reference time, in order to cause each of the plurality of viewer terminals to generate a video including an animation of the avatar object and the token object, wherein:

in the video generated by each of the plurality of viewer terminals, the token object can be disposed in accordance with the data regarding the coordinates of the token object associated with the reference time, the avatar object is displayed to operate in synchronization with the motion of the distributor, data regarding the viewer who has given the token object to the distributor are displayed in connection with the token object, the animation of the avatar object generated by the at least one processor is the same as the animation of the avatar object generated by each of the plurality of viewer terminals, and the animation of the token object generated by the at least one processor is the same as the animation of the token object generated by each of the plurality of viewer terminals.

10. The computer-implemented method according to claim 9, further comprising:

transmitting, toward the plurality of viewer terminals, the motion data associated with the reference time.

11. The computer-implemented method according to claim 9, further comprising:

transmitting, toward the plurality of viewer terminals, identification data identifying the token object.

12. The computer-implemented method according to claim 9, further comprising:

adding a time stamp to the transmitted audio data indicating the reference time.

13. The computer-implemented method according to claim 9, further comprising:

storing the generated video and the coordinate data in a computer-readable storage device.

14. A terminal device, comprising:

at least one processor configured to:

generate a video including an animation of an avatar object of a distributor generated on the basis of motion data regarding a motion of the distributor and an animation of a gift object given by a first viewer to the distributor operating according to a predetermined rule, the viewer being associated with a first viewer terminal; and transmit, toward a plurality of viewer terminals including the first viewer terminal via a communication line, coordinate data including data regarding coordinates of the gift object associated with a reference time, and audio data regarding a voice of the distributor associated with the reference time, in order to cause each of the plurality of viewer terminals to generate a video including an animation of the avatar object and the gift object, wherein:

in the video generated by each of the plurality of viewer terminals, the gift object can be disposed in accordance with the data regarding the coordinates of the gift object associated with the reference time, the avatar object is displayed to operate in synchronization with the motion of the distributor, data regarding the viewer who has given the gift object to the distributor are displayed in connection with the gift object, and the animation of the avatar object generated by the terminal device is the same as the animation of the avatar object generated by each of the plurality of viewer terminals, and the animation of the gift object generated by the terminal device is the same as the animation of the gift object generated by each of the plurality of viewer terminals.

15. The terminal device according to claim 14, further comprising:

an image capture device coupled to the at least one processor, wherein the at least one processor is further configured to generate the motion data with images captured by the image capture device.

16. The terminal device according to claim 14, further comprising:
a near-infrared image capture device coupled to the at least one processor, wherein the at least one processor is further configured to generate the motion data using depth data produced by the near-infrared image capture device.

17. The terminal device according to claim 14, further comprising:
a video camera situated to generate the video.

* * * * *